United States Patent Office 2,769,704

Patented Nov. 6, 1956

2,769,704

METHOD OF PRODUCING PHOSPHATE FERTILIZERS

Louis E. Andrès, Saint Gratien, and Pierre G. Pagny, Paris, France, assignors to Potasse & Engrais Chimiques, Paris, France, a societe anonyme of France No Drawing. Application September 24, 1952, Serial No. 311,326

Claims priority, application France October 5, 1951

4 Claims. (Cl. 71—43)

This invention relates to the production of phosphate fertilizers and more particularly to the production of phosphate fertilizers which contain calcium phosphate in a form which is soluble in ammonium citrate and insoluble in water and which contains no calcium phosphate in a form which is insoluble in ammonium citrate.

Generally speaking, the larger the fraction, contained in a phosphate fertilizer, of phosphoric acid in a form soluble in ammonium citrate, the greater is the agricultural and market value of the fertilizer. The presence of phosphoric acid in a form which is soluble in water detracts from the stability of the fertilizer during storage. Consequently, it is logical to neutralize phosphate fertilizers as completely as possible in order to eliminate all water-soluble phosphoric acid. In other words, it is, for example, desirable to produce a phosphate fertilizer which is free from mono-calcium phosphate (which is soluble in water) and free from tri-calcium phosphate (which is insoluble in ammonium citrate), so that the phosphate in the fertilizer is in the form of di-calcium phosphate (which is soluble in ammonium citrate and insoluble in water). In speaking herein of solubility, it will be understood that what is meant is solubility according to tests customarily applied in commercial practice in the fertilizer industry.

The processes ordinarily employed in producing phosphate fertilizers from natural phosphate rock do not permit of the production of a fertilizer which contains all of its calcium phosphate in a form which is soluble in ammonium citrate and which is free from calcium phosphate in a form which is soluble in water and at the same time free from calcium phosphate in a form which is insoluble in ammonium citrate. In fact, if a natural phosphate rock is attacked with mineral acid to convert all of its phosphate content to water-soluble phosphoric acid and to this reaction product is added a neutralizing agent such as lime, calcium carbonate, or ammonia, it is found that there is formation of a certain amount of calcium phosphate in a form insoluble in ammonium citrate, namely, tri-calcium phosphate, before the water-soluble phosphoric acid has completely disappeared. That is, if neutralizing agent is added sufficient to neutralize the reaction product of the rock phosphate and mineral acid, there is a reversion of some of the phosphate to tri-calcium phosphate and this is undesirable. If not completely neutralized, the fertilizer may contain some water-soluble phosphate and if attempt is made to eliminate the water-soluble phosphate by further addition of neutralizing agent, then unwanted tri-calcium phosphate is formed.

It is an object of this invention to remedy the above mentioned drawback.

In accordance with this invention, after a natural phosphate rock has been treated with a mineral acid, such as nitric acid in order to convert all the phosphate to water-soluble phosphoric acid, in the manner of processes already known, and iron salt or compound capable of producing ferrous or ferric ions is added to the reaction product of the rock phosphate and mineral acid in a proportion to insure the presence of at least 20 mols of iron to 100 mols of $P_2O_5$, after which the neutralizing agent may be added until all the phosphoric acid in water-soluble form has disappeared. We have found that if this procedure is followed, the calcium phosphate which is precipitated is completely soluble in ammonium citrate and there is no reversion of the phosphoric acid to calcium phosphate in a form which is insoluble in ammonium citrate, namely, tri-calcium phosphate. Moreover, the calcium phosphate which is formed is in di-calcium form and continues to be soluble in ammonium citrate regardless of the temperature at which the drying is carried out, and despite a long period of storage.

Tests have been made by us, using different ferrous compounds, naturally occurring and others (such, for example, as the silicate, silico-aluminate, phosphate, oxide, sulphate and nitrate) and in every case we observed the same results for the same quantity of ferrous ions introduced. Moreover, the iron compound may be one in which the Fe is in the ferrous or ferric form and it will be understood that in speaking herein of ferrous ions both the ferrous and ferric forms of Fe are contemplated.

The amount of iron compound to be added is that which will insure the presence in the reaction product of the rock phosphate and mineral acid of at least 20 atom-grammes (mols) of iron to 100 mols of $P_2O_5$. Below this proportion of iron, phosphoric acid in a form which is insoluble in ammonium citrate (that is, tri-calcium phosphate) is produced. On the other hand, a proportion of iron greater than indicated above is not necessarily harmful, but produces no advantages.

The mass resulting from the reaction of the phosphoric rock and mineral acid, and to which has been added the amount of ferrous ions specified above, may be treated with a great excess of neutralizing agent without there being formed any phosphate in a form which is insoluble in ammonium citrate. Sufficient neutralizing agent may be added to make the mass distinctly alkaline and the pH may be raised even as high as pH 10 whereas if the mass were to be neutralized without the addition of the Fe ions, all of the phosphate in the fertilizer would be converted into a form which is insoluble in ammonium citrate if the pH were raised to pH 10.

The invention is applicable to the manufacture of calcium phosphates soluble in ammonium citrate; which constitute simple fertilizers having a high agricultural value, or to the manufacture of complex fertilizers containing other fertilizer ingredients in addition to calcium phosphates. Also, it is applicable to the production of super-phosphate which may be completely neutralized without the formation in the fertilizer of calcium phosphate in a form which is insoluble in ammonium citrate.

In the case of complex fertilizer made by attacking rock phosphate with nitric acid, followed by neutralization with ammonia, a complete fertilizer (containing $P_2O_5$; $K_2O$; N) may be made according to the process of the invention that also will be free from calcium nitrate, which is undesirable because it is water-absorbent. After the requisite quantity of ferrous ions as specified above has been added to the mass resulting from the acid treatment of the rock phosphate and after ammonia has been added in a quantity corresponding to the quantity of nitric acid used in the acid treatment, sulphuric acid may be added to fix the lime (that is, the calcium present in excess of that required to form bi-calcium phosphate) to fix it in the form of calcium sulphate, which is stable and not water-absorbent.

Recourse may also be had to phosphoric acid ($H_3PO_4$) to fix the lime by converting any calcium nitrate present into calcium phosphate. Carbonic acid gas may also be used to advantage in fixing the lime, but in this case, it may be necessary to add a compound capable of producing sulphate ions in an amount to insure the presence of sulphate ions stoichiometrically equivalent to the ferrous ions introduced. This addition of sulphate ions may be made either in the form of sulphuric acid or in the form of a sulphate; gypsum being well suited for the purpose. If desired, the addition of Fe ions and of $SO_4$ ions may be carried out as a single step by using ferrous or ferric sulphate.

Although the novel features which are believed to be characteristic of the invention will be pointed out in the annexed claims, the invention itself as to its objects and advantages and the manner in which it may be carried out may be better understood by reference to the following examples taken in conjunction with the foregoing description.

*Example I*

One thousand (1000) kilogrammes of natural Moroccan phosphate, assaying 34.2% $P_2O_5$, are treated with 1450 litres of hydrochloric acid of density 1.16. The mass is agitated for two hours, then 65 kilogrammes of ferrous chloride are added, and finally 280 kilogrammes of slaked lime in the form of lime milk are added while thoroughly agitating the mass.

After the reaction is complete, the precipitated di-calcium phosphate product is filtered, washed on the filter, and then dried. In this way 980 kilogrammes of di-calcium phosphate product assaying 34.5% $P_2O_5$ are obtained of which 99.6% is soluble in ammonium citrate and no more than negligible amount is soluble in water.

*Example II*

Two thousand five hundred (2500) kilogrammes of natural Tunisian phosphate of the Gafsa type, assaying 27.4% $P_2O_5$, are treated with 3,150 litres of 48.6% nitric acid. To the reaction mass thus obtained are mixed 310 kilogrammes of hydrated ferrous sulphate ($FeSO_4.7H_2O$) and then, while the mass is being continuously stirred, 550 kilogrammes of gaseous ammonia are introduced into it. When the addition of the ammonia is completed, 400 kilogrammes of carbonic acid gas are introduced into the mass.

After drying, 5350 kilogrammes of fertilizer were obtained containing 16.3% total nitrogen, of which 8.15% is in the form of nitrate nitrogen and 8.15% in the form of ammoniacal nitrogen; and 12.7% phosphoric acid ($P_2O_5$) of which 99.3% is soluble in ammonium citrate and not more than negligible amount is soluble in water.

*Example III*

Two thousand (2000) kilogrammes of natural phosphate, assaying 33.9% $P_2O_5$, are treated with 3,050 litres of 49.5% nitric acid. To the reaction product of the rock phosphate and acid are mixed 220 kilogrammes of anhydrous ferric sulphate [$Fe_2(SO_4)_3$], then there are injected into the mass of paste 540 kilogrammes of ammonia gas. When all the ammonia has been absorbed by the paste, 385 kilogrammes of carbonic acid gas are injected into it, after which it is dried.

After drying, 5400 kilogrammes of a binary fertilizer are obtained, containing 16.0% total nitrogen, of which 8.0% is in the form of nitrate nitrogen and 8.0% in the form of ammoniacal nitrogen, and 12.5% of phosphoric acid ($P_2O_5$) of which 99.0% is soluble in ammonium citrate and not more than negligible amount is soluble in water.

The terms and expressions which have been employed herein are those customarily used in commercial practice in the fertilizer industry and are used as terms of description and not of limitation, and there is no intention in the use of such terms and expressions of excluding any equivalents of the features shown and described or portions thereof, but it is recognized that various modifications are possible within the scope of invention claimed.

What is claimed is:

1. In a process for the manufacture of a phosphate fertilizer in which natural phosphate rock is reacted with a mineral acid and there is added a neutralizing agent to the mixture of said phosphate rock and mineral acid the method of preventing the formation in the reaction product of said phosphate rock, mineral acid and neutralizing agent of calcium phosphate in a form which is insoluble in ammonium citrate which comprises the step of adding to the mixture of phosphate rock and mineral acid a compound of iron in an amount to insure the presence of at least 20 mols of Fe to each 100 mols of $P_2O_5$ present in the mixture.

2. In a process of manufacturing a phosphate fertilizer in which natural phosphate rock containing calcium phosphate is reacted with nitric acid and there is added a neutralizing agent to the mixture of said phosphate rock and nitric acid, the method of preventing the formation in the reaction product of said phosphate rock, nitric acid and neutralizing agent of calcium phosphate in a form which is insoluble in ammonium citrate which comprises the steps of adding to said mixture of phosphate rock and nitric acid a compound of iron in an amount to insure the presence of at least 20 mols of Fe to each 100 mols of $P_2O_5$ present in the mixture and adding to said mixture a compound containing sulphate ions to insure the presence of sulphate ions in an amount to convert all calcium nitrate present into calcium sulphate.

3. In a process of manufacturing a phosphate fertilizer in which natural phosphate rock containing calcium phosphate is reacted with nitric acid and there is added a neutralizing agent to the mixture of said phosphate rock and nitric acid, the steps of adding to said mixture of phosphate rock and nitric acid of a compound containing iron capable of producing Fe ions in an amount to insure the presence in said mixture of at least 20 mols of Fe to each 100 mols of $P_2O_5$ present in the mixture and adding to the reaction product of said rock phosphate, nitric acid, neutralizing agent and iron-containing compound sufficient phosphoric acid to convert any calcium nitrate present into calcium phosphate.

4. In a process of manufacturing phosphate fertilizer in which natural phosphate rock containing calcium phosphate is reacted with nitric acid and ammonia is added to neutralize the reaction product of said phosphate rock and nitric acid, the steps of adding to the mixture of said phosphate rock and nitric acid a compound of iron capable of producing Fe ions in an amount to insure the presence of at least 20 mols of Fe for each 100 mols of $P_2O_5$ present and a compound capable of producing $SO_4$ ions to insure the presence of $SO_4$ ions in an amount stoichiometrically equivalent to the quantity of Fe ions introduced and adding carbonic acid in sufficient amount to convert all calcium nitrate present into calcium carbonate thereby to produce a phosphate fertilizer free from calcium nitrate and free from calcium phosphate in a form insoluble in ammonium citrate and in which all calcium phosphate present is in a form soluble in ammonium citrate and insoluble in water.

References Cited in the file of this patent

UNITED STATES PATENTS

| | | |
|---|---|---|
| 1,788,828 | Goldberg | Jan. 13, 1931 |
| 1,812,761 | Stevens et al. | June 30, 1931 |
| 1,849,704 | Boller | Mar. 15, 1932 |
| 1,871,195 | Ober et al. | Aug. 9, 1932 |
| 1,948,520 | Harvey | Feb. 27, 1934 |
| 2,053,432 | Harvey | Sept. 8, 1936 |
| 2,683,075 | Caldwell | July 6, 1954 |

OTHER REFERENCES

Waste Problems of the Iron and Steel Industries, Hodge, Inc. and Eng. Chem., vol. 31, #11, (pages 1364–80), November 1939.

Methods of Separating and Purifying Radioisotopes, Tompkins, Isolype Division, Circular C–11, June 1948, U. S. Atomic Energy Comm., Oak Ridge, Tenn., (pages 1–17).